United States Patent
Yi et al.

(10) Patent No.: US 7,463,891 B2
(45) Date of Patent: Dec. 9, 2008

(54) RRC CONNECTION REQUEST METHOD AND APPARATUS FOR MOBILE COMMUNICATIONS

(75) Inventors: Seung June Yi, Seoul (KR); Young Dae Lee, Kyoungki-do (KR); Sung Duck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 913 days.

(21) Appl. No.: 10/845,285

(22) Filed: May 12, 2004

(65) Prior Publication Data

US 2004/0229626 A1 Nov. 18, 2004

(30) Foreign Application Priority Data

May 13, 2003 (KR) .............................. 2003-30277

(51) Int. Cl.
*H04Q 7/20* (2006.01)
(52) U.S. Cl. .................... 455/450; 455/451; 455/452.1; 455/452.2; 455/464; 370/329
(58) Field of Classification Search ................ 455/450, 455/451, 452.1, 452.2, 453, 462, 456.1, 434, 455/435.1, 458, 515, 574; 370/329, 311
See application file for complete search history.

(56) References Cited

U.S. PATENT DOCUMENTS

2002/0110106 A1 * 8/2002 Koo et al. .................... 370/341

(Continued)

FOREIGN PATENT DOCUMENTS

WO WO 00/54522 A2 9/2000

OTHER PUBLICATIONS

"3rd Generation Partnership Project; Technical Specification Group Radio Access Network; Introduction of the Multimedia Broadcast Multicast Service (MBMS) in the Radio Access Network (Stage-2); (Release 6); 3GPP TS 25.346 V1.1.0" 3GPP TS 25.346 V1.5.0, Mar. 2003, pp. 1-16, XP002363447.

(Continued)

*Primary Examiner*—Lester Kincaid
*Assistant Examiner*—Sayed T Zewari
(74) *Attorney, Agent, or Firm*—Lee, Hong, Degerman, Kang & Waimey

(57) ABSTRACT

A method and apparatus for transmitting a single counting end message to reject the RRC connection requests of a plurality of terminals, thus minimizing the waste of radio resources and providing a quick response to those terminals that transmitted a connection request. RRC connection request messages are sent by a plurality of terminals to a network in response to an RRC connection-required message received from the network on a first channel. Each terminal monitors a second channel for an RRC connection setup message. The network establishes connections with a predetermined number of terminals by transmitting an RRC connection setup message to each terminal on the second channel and then transmits a single RRC connection-not-required message to the plurality of terminals on the first channel. Each terminal that does not receive an RRC connection setup message on the second channel after a predetermined period of time then monitors the first channel and, after receiving the RRC connection-not-required message, terminates the network connection procedure and does not re-transmit an RRC connection request message.

19 Claims, 9 Drawing Sheets

U.S. PATENT DOCUMENTS

2004/0032877 A1 * 2/2004 Chuah et al. ............... 370/444

OTHER PUBLICATIONS

"Universal Mobile Telecommunications System (UMTS), RRC Protocol Specification (3GPP TS 25.331 version 4.1.0 Release 4); ETSI TS 125 331" FTSI Standards, European Telecommunication Standards Institute, Sophia-Antipo, FR, No. V410, Jun. 2001, XP002363448.

* cited by examiner

RRC CONNECTION REQUEST METHOD AND APPARATUS FOR MOBILE COMMUNICATIONS

CROSS-REFERENCE TO RELATED APPLICATIONS

Pursuant to 35 U.S.C. § 119(a), this application claims the benefit of earlier filing date and right of priority to Korean Application No. 2003-030277, filed on May 13, 2003 the contents of which is hereby incorporated by reference herein in its entirety:

BACKGROUND OF THE INVENTION

1. Field of the Invention

The present invention relates to a method and apparatus for establishing an RRC connection that is an initial connection established between a terminal in idle state and a UTRAN in a UMTS (Universal Mobile Telecommunication System), and specifically, a method and apparatus facilitating a terminal sending an RRC connection request message, receiving a first channel for a certain time, and if a response to the RRC connection request message is not received on the first channel, determining whether the RRC connection request message should be re-transmitted based on counting status information provided via a second channel.

2. Description of the Related Art

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology.

In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology. In order to achieve rapid and efficient technical development of the UMTS, five technical specification groups (TSG) have been created within the 3GPP for standardizing the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 illustrates an exemplary basic structure of a general UMTS network. As shown in FIG. 1, the UMTS is roughly divided into a terminal or user equipment (UE) 10, a UTRAN 20, and a core network (CN) 30.

The UTRAN 20 includes one or more radio network subsystems (RNS) 25. Each RNS 25 includes a radio network controller (RNC) 23 and a plurality of Node-Bs (base stations) 21 managed by the RNC 23. The RNC 23 handles the assignment and management of radio resources and operates as an access point with respect to the core network 30.

The Node-Bs 21 receive information sent by the physical layer of the terminal 10 through an uplink and transmit data to the terminal 10 through a downlink. The Node-Bs 21 operate as access points of the UTRAN 20 for the terminal 10.

The UTRAN 20 constructs and maintains a radio access bearer (RAB) for communication between the terminal 10 and the core network 30. The core network 30 requests end-to-end quality of service (QoS) requirements from the RAB, and the RAB supports the QoS requirements the core network 30 has set. Accordingly, by constructing and maintaining the RAB, the UTRAN 20 can satisfy the end-to-end QoS requirements.

The services provided to a specific terminal 10 are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs 23 are connected to the mobile switching center (MSC) 31 of the core network 30 and the MSC 31 is connected to the gateway mobile switching center (GMSC) 33 that manages the connection with other networks. For supporting packet switched services, the RNCs 23 are connected to the serving general packet radio service (GPRS) support node (SGSN) 35 and the gateway GPRS support node (GGSN) 37 of the core network 30. The SGSN 35 supports the packet communications with the RNCs 23 and the GGSN 37 manages the connection with other packet switched networks, such as the Internet.

FIG. 2 illustrates a structure of a radio interface protocol between the terminal 10 and the UTRAN 20 according to the 3GPP radio access network standards. As shown in FIG. 2, the radio interface protocol has horizontal layers comprising a physical layer, a data link layer, and a network layer, and has vertical planes comprising a user plane (U-plane) for transmitting user data and a control plane (C-plane) for transmitting control information.

The user plane is a region that handles traffic information with the user, such as voice or Internet protocol (IP) packets. The control plane is a region that handles control information for an interface with a network, maintenance and management of a call, and the like.

The protocol layers in FIG. 2 can be divided into a first layer (L1), a second layer (L2), and a third layer (L3) based on the three lower layers of an open system interconnection (OSI) standard model.

The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer.

The MAC layer handles mapping between logical channels and transport channels and provides allocation of the MAC parameters for allocation and re-allocation of radio resources. The MAC layer is connected to an upper layer called the radio link control (RLC) layer, via a logical channel.

Various logical channels are provided according to the type of information transmitted. In general, a control channel is used to transmit information of the control plane and a traffic channel is used to transmit information of the user plane.

A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH), and a paging control channel (PCCH). The BCCH provides information including information utilized by a terminal 10 to access a system. The PCCH is used by the UTRAN 20 to access a terminal 10.

The MAC layer is connected to the physical layer by transport channels and can be divided into a MAC-b sub-layer, a MAC-d sub-layer, a MAC-c/sh sub-layer, and a MAC-hs sub-layer according to the type of transport channel being managed. The MAC-b sub-layer manages a BCH (Broadcast Channel), which is a transport channel handling the broadcasting of system information. The MAC-c/sh sub-layer manages a common transport channel, such as a forward access channel (FACH) or a downlink shared channel (DSCH), which is shared by a plurality of terminals. The MAC-d sub-layer manages a dedicated channel (DCH), which is a dedicated transport channel for a specific terminal 10. Accordingly, the MAC-d sublayer is located in a serving RNC (SRNC) that manages a corresponding terminal, and one MAC-d sublayer also exists in each terminal.

The RLC layer supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity and then creates data units by adding header information thereto. The data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals 10 positioned in a specific cell or cells.

The PDCP layer is located above the RLC layer. The PDCP layer is used to transmit network protocol data, such as the IPv4 or IPv6, effectively on a radio interface with a relatively small bandwidth. For this purpose, the PDCP layer reduces unnecessary control information used in a wired network, a function called header compression.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). The RB signifies a service provided by the second layer (L2) for data transmission between the terminal 10 and the UTRAN 20. In general, the set up of the RB refers to the process of stipulating the characteristics of a protocol layer and a channel required for providing a specific data service, and setting the respective detailed parameters and operation methods.

The RRC state refers to whether there exists a logical connection between the RRC of the terminal 10 and the RRC of the UTRAN 20. If there is a connection, the terminal 10 is said to be in RRC connected state. If there is no connection, the terminal 10 is said to be in idle state.

For terminals 10 in RRC connected state, because an RRC connection exists the UTRAN 20 can determine the existence of a particular terminal within the unit of cells, for example which cell the RRC connected state terminal is in. Thus, the terminal 10 can be effectively controlled.

In contrast, the UTRAN 20 cannot determine a terminal 10 in idle state. Such idle state terminals 10 can only be determined by the core network 30 to be within a region that is larger than a cell, namely, a location or a routing area. Therefore, the existence of idle state terminals 10 is determined within large regions, and, in order to receive mobile communication services such as voice or data, the idle state terminal must move or change into the RRC connected state.

When initially turned on by the user, a terminal 10 searches for an appropriate cell and then remains in idle state within the corresponding cell. When the idle state terminal 10 requires RRC connection, it transitions to the RRC connected state through an RRC connection procedure so that an RRC connection is made with the RRC layer of the UTRAN 20.

There are many situations where an idle state terminal 10 needs to establish an RRC connection. When uplink data transmission is necessary, for example when the user attempts to make a call, or when transmitting a response message in reply to a paging message received from the UTRAN 20, an idle state terminal 10 must establish an RRC connection. Another situation where an idle terminal 10 needs to establish an RRC connection is in order to receive a multimedia broadcast multicast service (MBMS).

The 3GPP system can provide multimedia broadcast multicast service (MBMS), which is a new type of service in Release 6. The 3GPP TSG SA (Service and System Aspect) defines various network elements and their functions required for supporting MBMS services. A cell broadcast service provided by the conventional Release 99 is limited to a service in which text type short messages are broadcast to a certain area. The MBMS service provided by Release 6 is a more advanced service that multicasts multimedia data to terminals (UEs) 10 that have subscribed to the corresponding service in addition to broadcasting multimedia data.

The MBMS service is a downward-dedicated service that provides a streaming or background service to a plurality of terminals 10 by using a common or dedicated downward channel. The MBMS service is divided into a broadcast mode and a multicast mode.

The MBMS broadcast mode facilitates transmitting multimedia data to every user located in a broadcast area, whereas the MBMS multicast mode facilitates transmitting multimedia data to a specific user group located in a multicast area. The broadcast area signifies a broadcast service available area and the multicast area signifies a multicast service available area.

Users who desire to receive the MBMS service first receive a service announcement provided by a network. The service announcement provides the terminal 10 with a list of services to be provided and related information. In addition, the users must receive a service notification provided by the network. The service notification provides the terminal 10 with information related to the broadcast data to be transmitted.

If the user intends to receive the multicast mode MBMS service, the user subscribes to a multicast subscription group. A multicast subscription group is a group of users who have completed a subscription procedure. Once a user has subscribed to the multicast subscription group, the user can join a multicast group to receive a specific multicast service. A multicast group is a group of users that receive a specific multicast service. Joining a multicast group, also referred to as MBMS multicast activation, means merging with the multicast group that has users who wish to receive the specific multicast service. Accordingly, the user can receive the specific multicast data by joining a multicast group, referred to as MBMS multicast activation.

The RNC 23 transfers the MBMS user data to the terminal 10 through the base station (Node-B) 21 via the user plane of the UTRAN protocol. The UTRAN 20 transfers the MBMS user data by constructing and maintaining a radio access bearer (RAB) for a call communication between the terminal 10 and the core network 30. The MBMS user data is transferred only by downlink. The MBMS radio bearer facilitates transferring, only to a specific terminal 10, the user data of a specific MBMS service transferred by the core network 30 to the UTRAN 20.

The MBMS radio bearer is divided into a point-to-multipoint type and a point-to-point type. The UTRAN 20 selects one of the two types of MBMS radio bearers to provide the MBMS service. To select one of the two MBMS radio bearers, the UTRAN 20 should recognize the number of users, or terminals 10, of a specific MBMS service existing in one cell.

The UTRAN 20 may count the number of terminals 10 to determine the type of MBMS radio bearer. The UTRAN 20 informs the terminals 10 that it is counting the number of terminals when it provides information about the MBMS service via a MBMS common control channel or performs paging for a specific MBMS service group.

When a terminal 10 receives a service notification of an MBMS service indicating that counting is being performed on the corresponding service, the terminal establishes a connection between an RRC entity of the terminal and an RRC entity of the UTRAN 20 by transferring an RRC connection request message to the UTRAN through an uplink common channel. The RRC connection request message informs the UTRAN 20 that the terminal 10 desires to receive the corresponding MBMS service.

By counting the number of terminals 10 that have transferred an RRC connection request message, the UTRAN 20 can recognize users who desire to receive the specific MBMS service in one cell. The UTRAN 20 then sets up an MBMS radio bearer on the basis of the count.

If the number of users, or terminals 10, existing in a corresponding cell is smaller than a certain threshold value, the UTRAN 20 sets a point-to-point MBMS radio bearer. If the number of users, or terminals 10, existing in a corresponding cell is greater than or equal to a certain threshold value, the UTRAN sets a point-to-multipoint MBMS radio bearer. However, the conventional paging method through which the UTRAN 20 recognizes the number of terminals 10 that desire to receive an MBMS service has shortcomings.

When the UTRAN 20 performs the MBMS service notification, response messages, such as RRC response messages, are transmitted from terminals 10 that desire to receive the MBMS service. The response messages are simultaneously concentrated at uplink channel, resulting in an increase in interference and load on the uplink. Because the UTRAN 20 performs the MBMS service notification to the plurality of terminals 10 using the MBMS common control channel and the corresponding terminals simultaneously inform the UTRAN that they want to receive the corresponding MBMS service through the uplink common channel both the interference and load on the uplink increases.

Because the interference and load increases, an undesirably long period of time may be required for the terminals 10 to send response messages. Therefore, some terminals may fail to transmit the response message by the time the UTRAN 20 should set up the MBMS radio bearer.

Once the UTRAN 20 receives a number of response messages from the terminals 10 that is above the threshold for setting up the MBMS point-to-multipoint radio bearer, the UTRAN no longer needs to receive additional response messages because all requirements for selecting the radio bearer have been met. However, in the conventional art, even if the UTRAN 20 has already received above a threshold number of response messages, the UTRAN continues to receive response messages until the MBMS radio bearer is set. Therefore, uplink radio resources are undesirably wasted.

The RRC connection procedure is generally divided into three steps; the terminal 10 transmits an RRC connection request message to the UTRAN 20, the UTRAN transmits an RRC connection setup message to the terminal, and the terminal transmits an RRC connection setup complete message to the UTRAN. These steps are illustrated in FIG. 3.

FIG. 3 illustrates the conventional art procedure when the UTRAN 20 accepts the RRC connection request of the terminal 10. When an idle state terminal 10 wishes to establish an RRC connection, the terminal first transmits an RRC connection request message to the UTRAN 20. The RRC connection request message may include an RRC establishment cause and an initial terminal identifier. The initial terminal identifier, or UE identity, is an identifier that is unique to a particular terminal 10 and allows that terminal to be identified despite its location anywhere in the world.

In response to the RRC connection request, the UTRAN 20 transmits an RRC connection setup message to the terminal 10. The RRC connection setup message may include an RNTI (Radio Network Temporary Identity) and radio bearer setup information transmitted together with an initial UE identity. The RNTI is a terminal identifier allocated to allow the UTRAN 20 to identify connected state terminals 10. The RNTI is used only when an RRC connection exists and is used only within the UTRAN 20.

In response to the RRC connection setup message, the terminal 10 establishes an RRC connection with the UTRAN 20 and transmits an RRC connection setup complete message to the UTRAN 20. After the RRC connection has been established, the terminal 10 uses the RNTI instead of the initial UE identity when communicating with the UTRAN 20.

Because the initial UE identity is a unique identifier, frequent use may increase the chances of undesirable exposure. Therefore, the initial UE identity is used briefly only during the initial RRC connection procedure and the RNTI is used thereafter for security reasons.

However, the UTRAN 20 may also reject the RRC connection request for a variety of reasons, for example insufficient radio resources. FIG. 4 illustrates the conventional art procedure when the UTRAN 20 rejects the RRC connection request of the terminal 10.

Upon receiving an RRC connection request from the terminal 10, the UTRAN 20 transmits an RRC connection reject message if it is necessary to reject the RRC connection. An initial UE identity and rejection cause are included in the RRC connection reject message to inform the terminal 10 why the RRC connection was rejected. Upon receiving the RRC connection reject message, the terminal 10 returns to an idle state.

FIG. 5 illustrates a conventional art method 100 for a terminal 10 requesting an RRC connection. The method 100 includes transmitting an RRC connection request message (S110) and operating a timer (S120), determining whether an RRC connection setup message (S130) or an RRC connection reject message (S144) is received before the timer expires (S150), and repeating the process unless an RRC connection setup message or an RRC connection reject message was received or it is determined that a threshold for sending RRC connection requests has been reached (S160).

Upon receiving an RRC connection request message from the terminal 10, the UTRAN 20 grants the RRC connection request if radio resources are sufficient and transmits an RRC connection setup message to the terminal. Otherwise the UTRAN rejects the RRC connection request and transmits an RRC connection reject message to the terminal 10.

Upon determining that an RRC connection setup message was received in step S130, the initial UE identity included in the RRC connection setup message is compared to the terminal's own identity to determine whether the message was intended for that terminal 10. If the initial UE identity included in the RRC connection setup message is different than that of the terminal 10, the terminal discards the received message and determines whether an RRC connection reject message was received in step S144. If the initial UE identity included in the RRC connection setup message matches that of the terminal 10, the terminal establishes an RRC connection with the UTRAN 20 and transitions to the RRC connected state.

Upon establishing an RRC connection with the UTRAN 20, the RNTI allocated by the UTRAN 20 is stored and an RRC connection setup complete message is transmitted to the UTRAN 20 in step S142. The RRC connection setup complete message includes capability information of the terminal 10. Transmission of additional RRC connection request messages is terminated in step S170.

Upon determining that an RRC connection reject message was received in step S144, the initial UE identity included in the RRC connection reject message is compared to the terminal's own identity to determine whether the message was intended for that terminal 10. If the initial UE identity included in the RRC connection reject message is different than that of the terminal 10, the terminal discards the received message and the state of the timer is checked in step S150. If the initial UE identity included in the RRC connection reject message matches that of the terminal 10, the terminal transitions to the idle state in step S146 and terminates the RRC connection attempt in step S170.

Upon determining that the timer has not expired in step S150, the terminal 10 continues to wait for reception of an RRC connection setup message or an RRC connection reject message. Upon determining that the timer has expired in step S150, it is determined in step S160 if a threshold limit for sending RRC connection request messages has been reached.

If the threshold limit for sending RRC connection request messages has been reached, the terminal 10 terminates the RRC connection attempt in step S170. If the threshold limit for sending RRC connection request messages has not been reached, another RRC connection attempt is initiated in step S110 and the process is repeated.

In the conventional art, when the UTRAN 20 needs to send RRC connection reject messages to a plurality of terminals that requested RRC connection, radio resources are wasted because transmitting RRC connection reject messages requires an undesirably long time. A prime example of such wasted radio resources occurs when providing a multicast service.

The UTRAN 20 utilizes a multicast service notification procedure to perform a counting operation to determine the total number of terminals 10 wishing to receive a particular multicast service within a particular cell. The counting operation is used to determine whether the radio bearer to provide the particular multicast service should be point-to-multipoint or point-to-point. If the number of terminals existing in the corresponding cell is less than a threshold value, a point-to-point radio bearer is set. If the number of terminals is greater than or equal to the threshold, a point-to-multipoint radio bearer is set.

When a point-to-point radio bearer is set for a particular service, the terminals 10 wishing to receive the service are all in RRC connected state. However, when a point-to-multipoint radio bearer is set for a particular service, all terminals 10 wishing to receive the service need not be in RRC connected state because RRC idle state terminals are also able to receive the multicast service through the point-to-multipoint radio bearer.

For a multicast service, selecting the radio bearer type using the counting operation is essential for effectively allocating radio resources. Therefore, the selecting operation is performed before starting a multicast service or periodically during the multicast service.

In order to count the number of terminals 10 at the UTRAN 20; those terminals in idle state transmit an RRC connection request message to the UTRAN immediately upon receiving a service notification. When the UTRAN 20 receives an RRC connection request message after service notification, the number of terminals 10 wishing to receive a particular multicast service within a cell is counted to determine the type of radio bearer. Based on the radio resource conditions, RRC connection setup messages are transmitted to a certain number of terminals 10 and RRC connection reject messages are transmitted to the remaining terminals so that some terminals can receive the corresponding service in RRC idle state.

Because multicast service is a service aimed at a large number of terminals 10, the UTRAN 20 receives RRC connection request messages from a large number of terminals almost simultaneously after service notification. The UTRAN 20 typically rejects a majority of these RRC connection requests. Since each RRC connection reject message informs only one terminal 10 that its RRC connection request has been rejected, an extended period of time and large amount of radio resources are expended to transmit RRC connection reject messages to all corresponding terminals, particularly in a multicast service in which a very large number of terminals are handled.

Additionally, if a terminal 10 that transmitted an RRC connection request message does not receive an RRC connection setup message or an RRC connection reject message within a certain period of time, the terminal transmits the RRC connection request message again. The re-transmission of RRC connection request messages wastes further radio resources since the UTRAN must receive each re-transmitted message.

Therefore, there is a need for a method and apparatus that facilitates informing a plurality of terminals that their RRC connection request was rejected and the RRC connection request should not be re-transmitted without having to send an RRC connection reject message to each terminal such that radio resources are conserved. The present invention addresses this and other needs.

SUMMARY OF THE INVENTION

The present invention is directed to a method and apparatus for establishing an RRC connection that is an initial connection established between a terminal in idle state and a UTRAN in a UMTS by which a single connection message including a counting status is utilized by the network to inform a plurality of terminals that their connection request should not be re-transmitted.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a mobile communication system and device that facilitates RRC connection between a terminal and UTRAN in a UMTS in a way that conserves radio resources. Specifically, a method and apparatus is provided that allows the UTRAN, via a single message transmitted to a plurality of terminals, to inform the plurality of terminals that their connection request should not be re-transmitted because their previous RRC connection request was rejected. Although the invention is described herein with regard to a UMTS developed by the 3GPP, it is contemplated that the methods and apparatus of the present invention may be applied whenever it is desired to inform a plurality of terminals in a mobile communication system that their connection request should not be re-transmitted because their previous request for connection has been rejected.

In one aspect of the present invention, a method is provided for a terminal in radio communication with a network. The method includes receiving a first connection message on a first channel indicating that a network connection with the terminal is required, transmitting a connection request to the network, waiting for a certain period of time to receive a connection response from the network on a second channel, receiving a second connection message on the first channel if the response message is not received within the certain period of time, and to determining whether to re-transmit the connection request based on the second connection message.

The second connection message includes either a connection-required indicator or a connection-not-required indicator. Preferably the second connection message is an RRC connection-required message or an RRC connection-not-required message.

If the second connection message includes a connection-required indicator, the connection request message is re-transmitted. If the second connection message includes a connection-not-required indicator, the connection request message is not re-transmitted.

Preferably the first connection message is an RRC connection-required message, the connection request is an RRC connection request message and the response message is an RRC connection setup message. Preferably, the first connection message, response message and second connection message are associated with a user service, such as an MBMS service.

In another aspect of the present invention, a method is provided for a terminal in radio communication with a network. The method includes receiving a first connection message on a first channel indicating that a network connection with the terminal is required, initiating a network connection procedure associated with a user service by transmitting a connection request message to the network, waiting to receive a connection response from the network on a second channel and terminating the network connection procedure upon the occurrence of an internal event and an external event.

The internal event is preferably the expiration of an internal timer with a predetermined time period. The external event is preferably the receipt of a second connection message on the first channel including a connection-not-required indicator, preferably an RRC connection-not-required message. Upon terminating the network connection procedure, the connection request message is not re-transmitted.

In a preferred embodiment, the method further includes re-transmitting the connection request message upon expiration of the internal timer and the occurrence of a different external event. The different external event is preferably the receipt of a second connection message on the first channel including a connection-required indicator, preferably an RRC connection-required message.

Preferably the first connection message is an RRC connection-required message, the connection request is an RRC connection request message and the response message is an RRC connection setup message. Preferably, the user service is an MBMS service.

It is contemplated that the first and second channels may be logical channels, transport channels or physical channels. Preferably, the first channel is an MBMS control channel and the second channel is a common control channel.

In another aspect of the present invention, a method is provided for a network in radio communication with a plurality of terminals. The method includes transmitting a first connection message indicating that a network connection is required to a plurality of terminals subscribing to a service on a first channel, receiving a connection request message from at least one of the plurality of terminals, transmitting a second connection message including a connection setup indication on a second channel to a specific terminal and transmitting a third connection message including either connection-required information or connection-not-required information to the plurality of terminals on the first channel.

Whether the third connection message includes connection-required information or connection-not-required information is based on the number of connection request messages received. In a preferred embodiment, the third connection message includes connection-required information if the number of connection request messages received is less than a predetermined threshold and the third connection message includes connection-not-required information if the number of connection request messages received is equal to or greater than the predetermined threshold.

It is contemplated that a plurality of second connection messages including a connection setup indication may be transmitted on the second channel. Each of the second connection messages is sent to a specific terminal and includes connection setup information, such as a terminal identifier, associated with the specific terminal.

Preferably the first connection message is an RRC connection-required message, the connection request is an RRC connection request message and the second connection message is an RRC connection setup message. Preferably, the user service is a point-to-multipoint service. Preferably, the third connection message is either an RRC connection-required message or an RRC connection-not-required message and includes a service identifier for the service.

In another aspect of the present invention, a terminal is provided for radio communication with a network. The terminal includes a transmitter, a display, a memory unit, a receiver and a processing unit.

The transmitter initiates a network connection process associated with a user service by transmitting a connection request message to the network to request a response message. The display conveys information to a user. The memory unit stores information related to the network connection and user service. The receiver receives a first connection message including a connection-required indicator and a second connection message including either a connection-required indicator or a connection-not-required indicator from the network on a first channel and receives a connection response message from the network on a second channel. The processing unit performs the methods of the present invention to determine if the connection response message is received within a certain period of time after sending the connection request message and, if the response message is not received, to evaluate the contents of the second connection message in order to either re-transmit the connection request message or terminate the network connection process.

In another aspect of the present invention, a network is provided for radio communication with a plurality of terminals. The terminal includes a transmitter, a receiver, a storage unit, and a controller.

The transmitter transmits a first connection message indicating a network connection associated with a service is required to a plurality of terminals subscribing to the service on a first channel, transmits a second connection message including connection setup information on a second channel to at least one specific terminal and transmits a third connection message including either connection-required information or connection-not-required information on the first channel to the plurality of terminals. The receiver receives a connection request message from at least one terminal. The storage unit stores information related to the network connection and user service. The controller performs the methods of the present invention to determine which of the plurality of terminals should setup a communication connection, send a second connection message to those terminals determined to receive a communication connection, and determine whether the third connection message should include connection-required information or connection-not-required information based on the number of connection request messages received.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
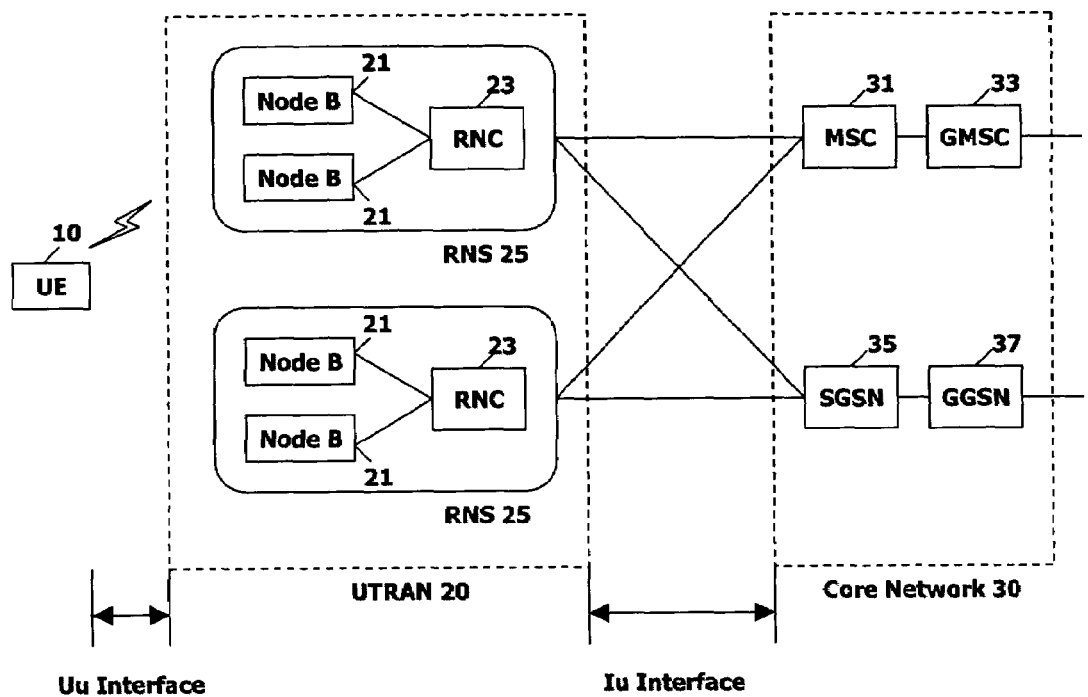
FIG. 1 illustrates a network structure of a general 3GPP UMTS system.
Figure 2:
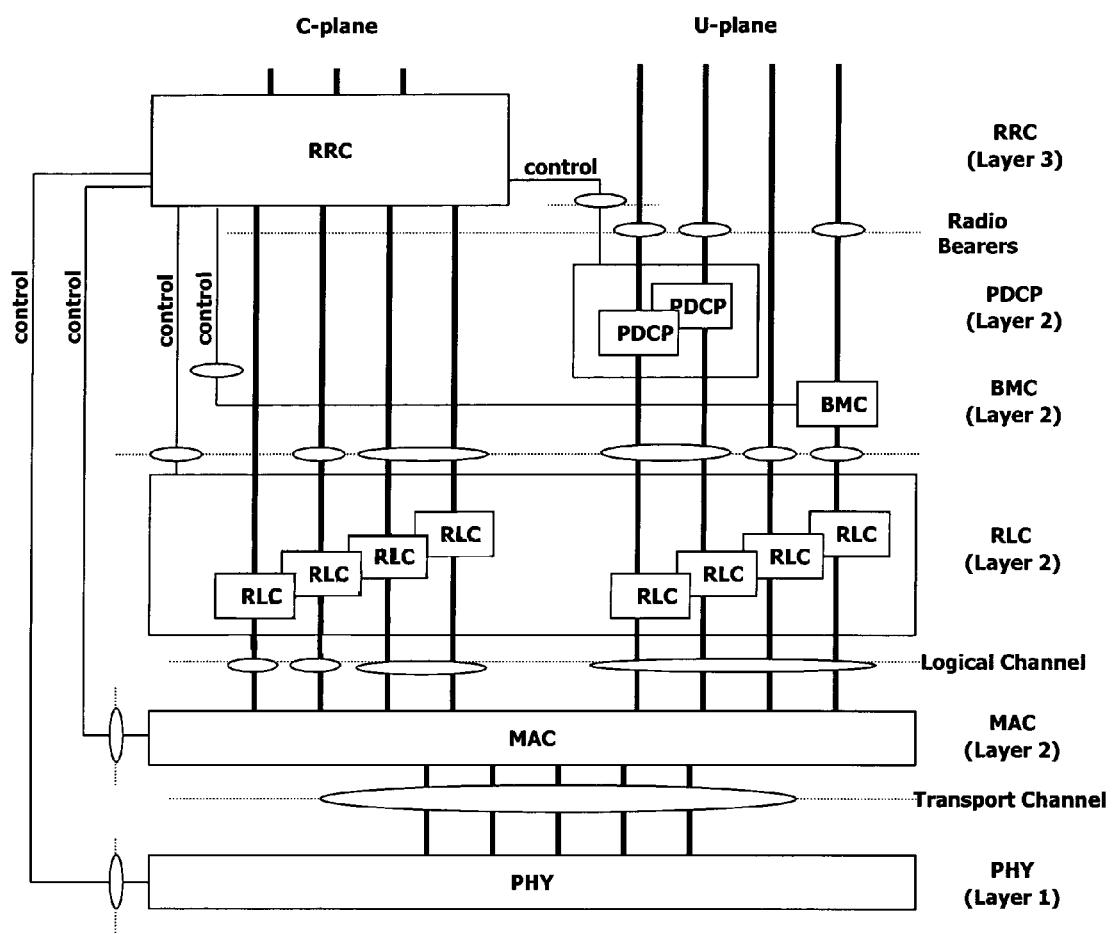
FIG. 2 illustrates an exemplary basic structure of a general UMTS network.
Figure 3:
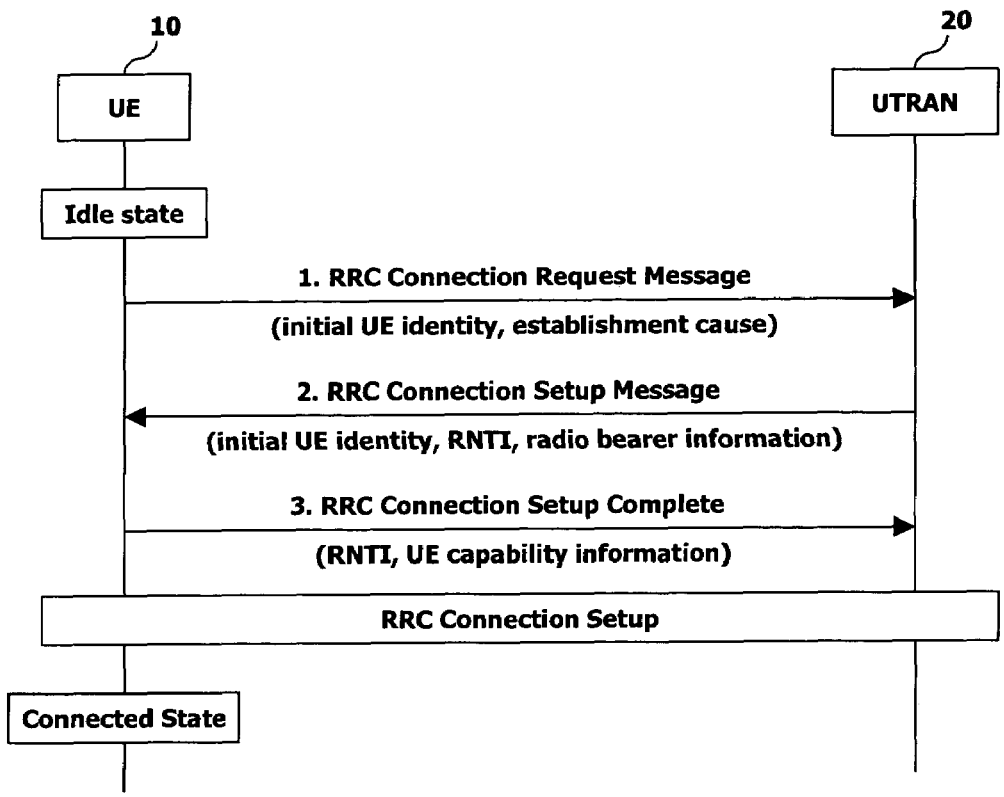
FIG. 3 illustrates the conventional art procedure when the UTRAN accepts the RRC connection request of a terminal.
Figure 4:
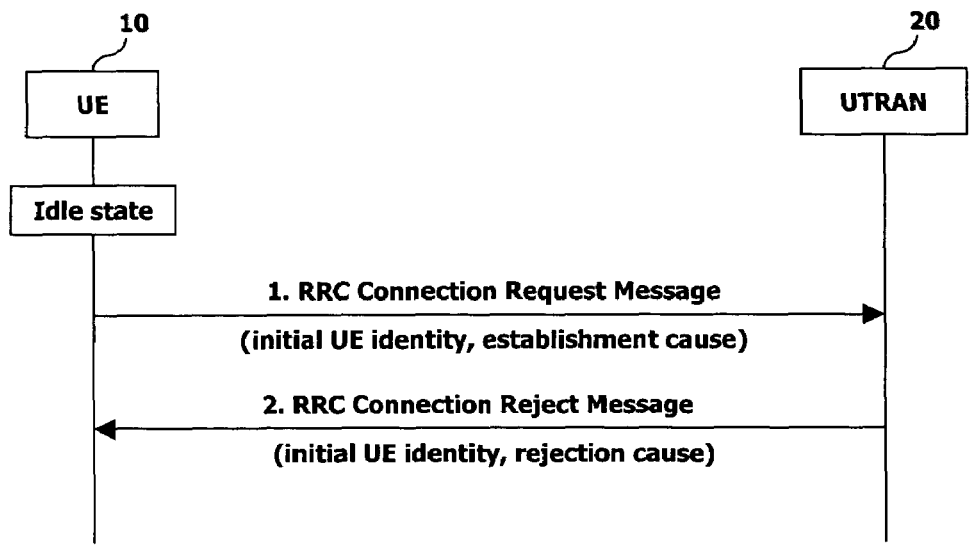
FIG. 4 illustrates the conventional art procedure when the UTRAN rejects the RRC connection request of a terminal.
Figure 5:
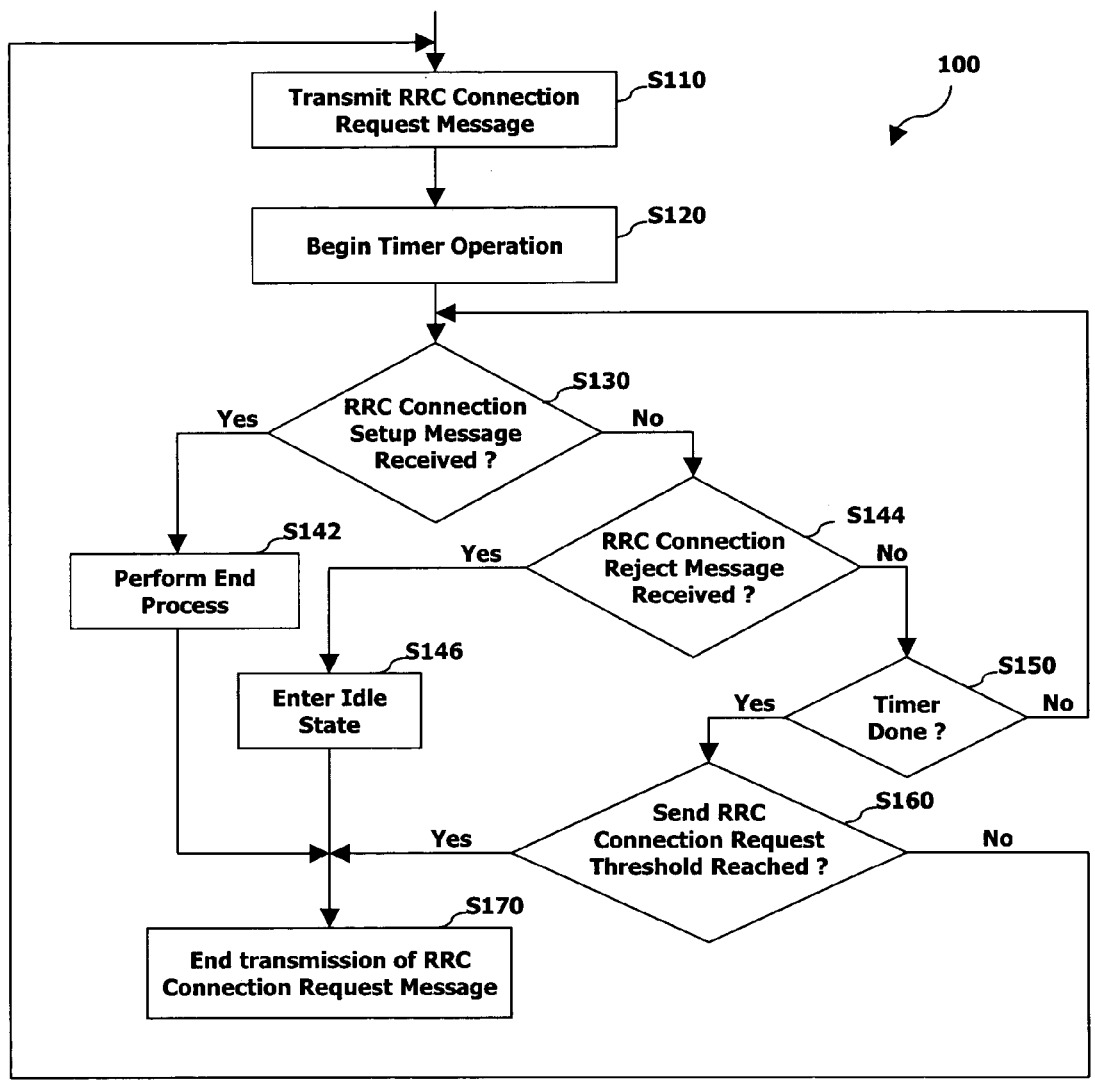
FIG. 5 illustrates a conventional art method for processing RRC connection setup messages and RRC connection reject messages.

The present invention relates to a method and apparatus for establishing an RRC connection that is an initial connection established between a terminal in idle state and a UTRAN in a UMTS by which a single connection message including a counting status is utilized by the network to inform a plurality of terminals that their connection request should not be re-transmitted. Although the present invention is illustrated with respect to a mobile communication system such as a UMTS developed by the 3GPP, and specifically an RRC connection associated with an MBMS user service, it is contemplated that the methods and apparatus described herein may also be applied to a communication system operating under similar and/or different standards when it is desired to inform a plurality of terminals that their connection request was rejected without having to send a connection reject message to each terminal such that radio resources are conserved.

The present invention provides a method and apparatus for a terminal 410 to terminate an attempt to request an RRC connection by having the UTRAN 520 broadcast a counting status information message to all terminals that wish to receive a particular MBMS service within a cell. The counting status message is transmitted via a dedicated MBMS common channel instead of transmitting a RRC connection reject message to each terminal 410 whose connection request was rejected. Because the counting status information message is broadcast to all terminals 410 wishing to receive a particular MBMS service, only information indicating whether counting has been completed need be included in the counting status information message. No information that identifies a specific terminal, such as an initial terminal identifier, need be included in the counting status information message.

The present invention also provides a method by which a terminal 410 re-transmits an RRC connection request upon receiving a counting status information message if an RRC connection setup message is not received within a certain period of time after transmitting the RRC connection request message. The terminal 410 determines whether to re-transmit the RRC connection request message based upon the contents of the counting status information message.

The UTRAN 520 transmits the RRC connection setup message via a first channel and transmits the counting status information message via a second MBMS common channel which is dedicated to those terminals 410 wishing to receive a particular MBMS service. The counting status information message may include a counting end command indicating that the counting for the particular MBMS service has been completed or a counting perform command indicating that counting is in progress for the particular MBMS service.

The terminal 410 operates a timer after transmitting an RRC connection request message and attempts to receive a RRC connection setup message transmitted to that terminal via the first channel. If the RRC connection setup message is not received before the timer expires, the terminal 410 switches to the second channel in order to receive the counting status information message for the MBMS service.

If the counting status information message includes a counting end command, the terminal 410 determines that the counting process for the MBMS service has ended and the RRC connection request message is not re-transmitted. If the counting status information message includes a counting perform command, the terminal 410 determines that the counting process for the MBMS service is continuing and re-transmits the RRC connection request message.

Figure 6:
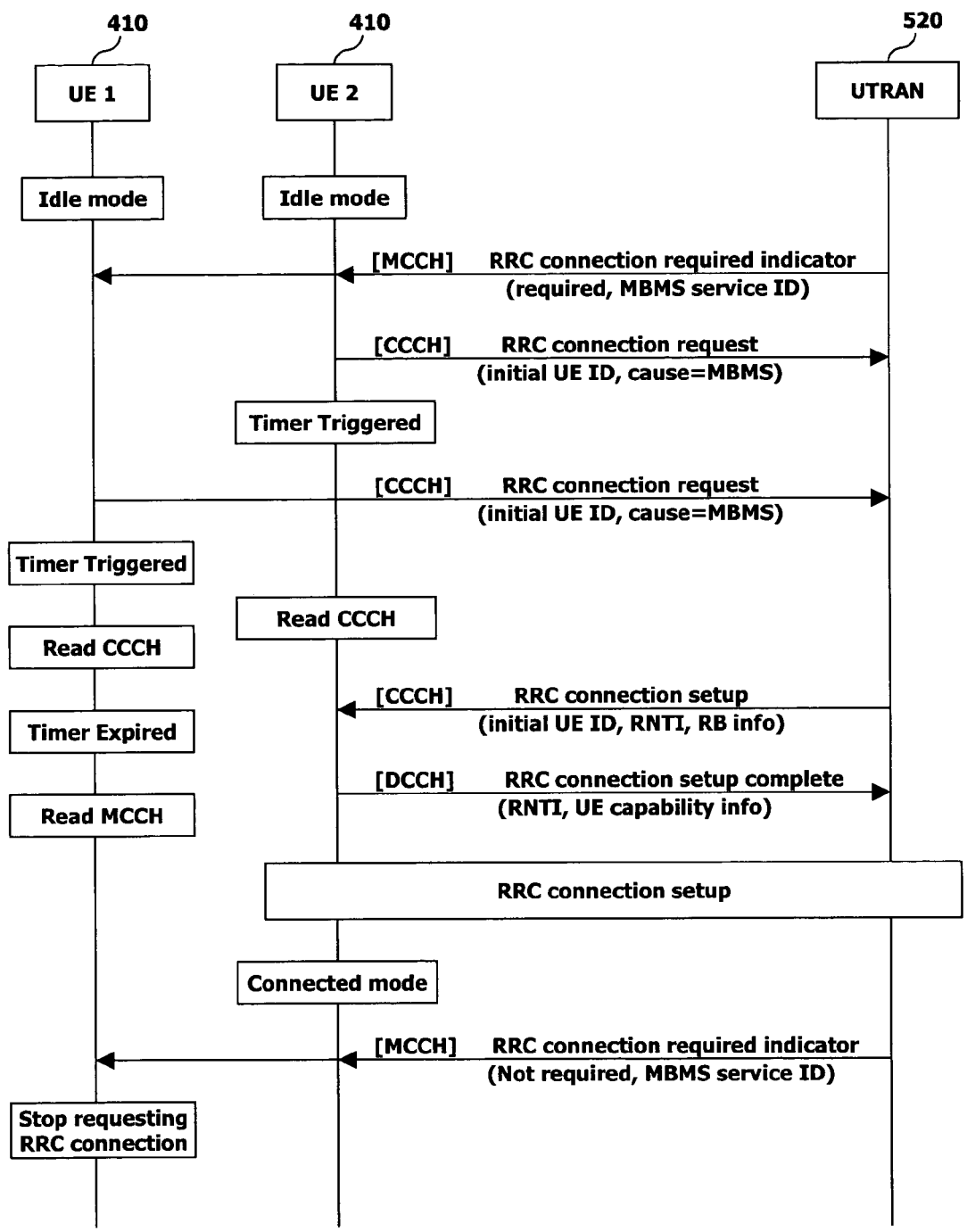
FIG. 6 illustrates the procedure when the UTRAN accepts the RRC connection request of one terminal and rejects the RRC connection request of another terminal according to the methods of the present invention.

FIG. 6 illustrates the procedure according to the present invention when the UTRAN 520 grants the RRC connection request of the one terminal 410 desiring to receive a particular MBMS service in a particular cell while rejecting the RRC connection request of another terminal desiring to receive the particular MBMS service in the particular cell. Upon receiving an RRC connection-required message from the UTRAN 520 on a first channel, terminals 410 in an idle state that desire to establish an RRC connection, such as UE 1 and UE 2, each transmit an RRC connection request message to the UTRAN.

The RRC connection-required messages may include a service ID associated with the particular MBMS service. Each RRC connection request message may include an RRC establishment cause and an initial terminal identifier. The initial terminal identifier, or UE identity, is an identifier that is unique to a particular terminal 410 and allows identification of the particular terminal despite its location anywhere in the world. Preferably, the RRC connection-required message is transmitted on an MBMS control channel (MCCH) and the RRC connection request messages are transmitted on a common control channel (CCCH).

Upon transmitting their respective RRC connection request messages, UE 1 and UE 2 each trigger an internal timer and wait for an RRC connection setup message on a second channel, preferably a common control channel (CCCH). As illustrated in FIG. 6, the UTRAN 520 determines that UE 2 should establish a network connection while UE 1 should not establish a network connection. The UTRAN 520 transmits an RRC connection setup message to UE 2 on the second channel, but does not transmit an RRC connection setup message to UE 1.

The RRC connection setup message transmitted to UE 2 may include an RNTI (Radio Network Temporary Identity) and radio bearer setup information transmitted together with an initial UE identity. The RNTI is a terminal identifier allocated to allow the UTRAN 520 to identify connected state terminals 410. The RNTI is used only when an RRC connection exists and is used only within the UTRAN 520.

In response to the RRC connection setup message, UE 2 establishes an RRC connection with the UTRAN 520 and transmits an RRC connection setup complete message to the UTRAN. After the RRC connection has been established, UE 2 is in the RRC connected state and uses the RNTI instead of the initial UE identity when communicating with the UTRAN 520.

On the other hand, UE 1, upon the expiration of its internal timer, switches to the first channel and receives an RRC connection-not-required message. The receipt of the RRC connection-not-required message indicates that the counting operation for the particular MBMS service has been completed, which means that the RRC connection request message from UE 1 was rejected. UE 1 terminates the RRC connection procedure and does not re-transmit the RRC connection request message.

Although FIG. 6 illustrates a procedure for only two terminals 410, the procedure is applicable to any number of terminals desiring to receive a particular MBMS service when the UTRAN 520 determines that some terminals should establish an RRC connection while other terminals should not establish an RRC connection. The terminals 410 determined to establish an RRC connection will receive an RRC connection setup message on the second channel and enter an RRC connected state. The terminals determined not to establish an RRC connection will receive the RRC connection-not-required message on the first channel and return to an idle state. Furthermore, it is contemplated that if the internal timer of a terminal 410 expires before receiving an RRC connection setup message, but the counting operation is still ongoing, the terminal will receive an RRC connection-required message on the first channel and re-transmit the RRC connection request message.

Figure 7:
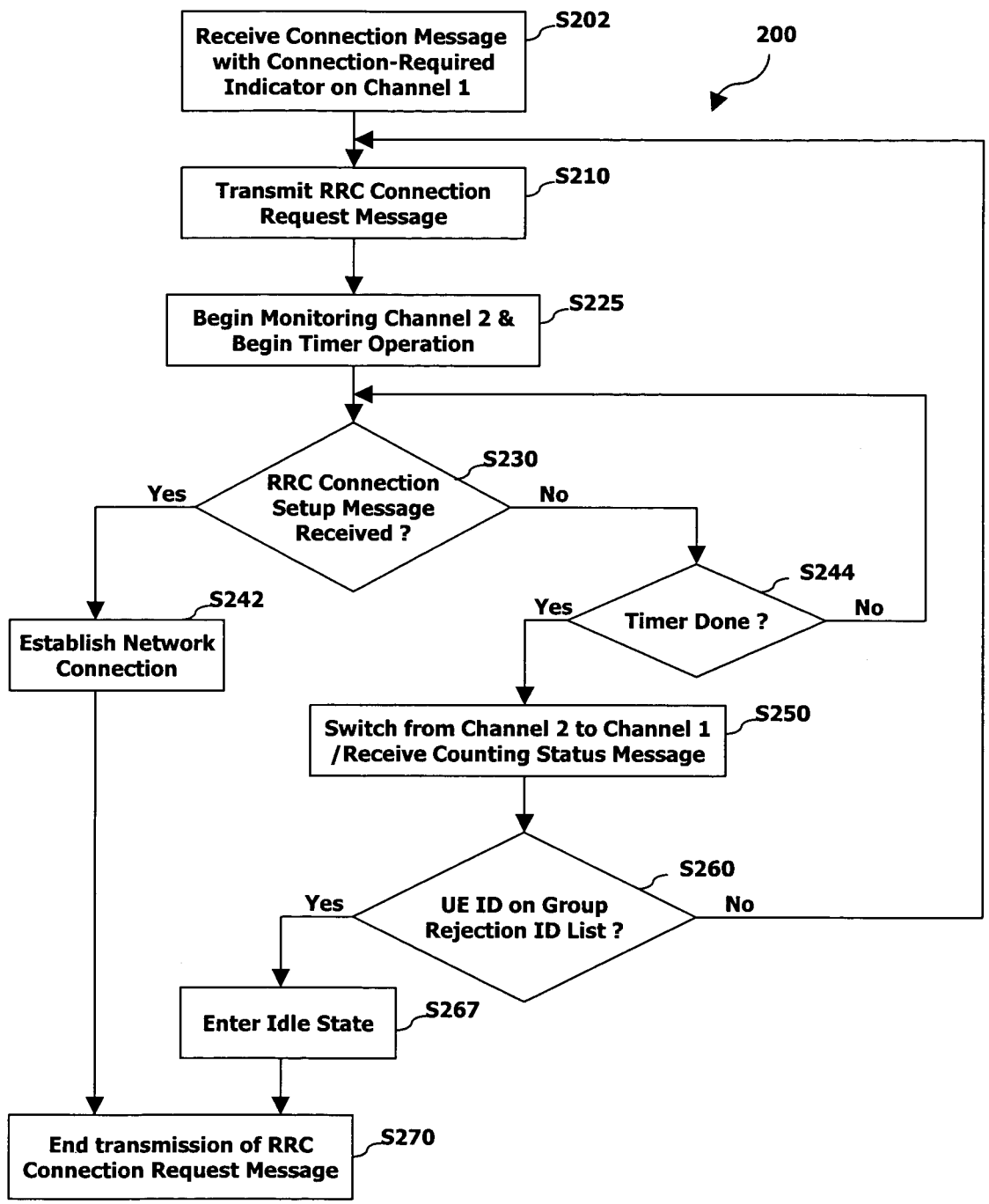
FIG. 7 illustrates a method for processing an RRC connection setup message, an RRC connection-required message or an RRC connection-not-required message according to one embodiment of the present invention.

FIG. 7 illustrates a method 200 for initiating an RRC connection process in a terminal 410, waiting for an RRC connection setup message and, upon not receiving the RRC connection setup message after a predetermined period of time, determining whether to re-transmit the RRC connection request message or terminate an RRC connection process according to one embodiment of the present invention. The method 200 includes receiving an RRC connection-required message on a first channel (S202), initiating a network connection process by transmitting an RRC connection request message (S210), reading a second channel (S225) and, if an RRC connection setup message is received (S230), establishing an RRC connection (S242) or, if an internal timer expires (S244) before an RRC connection setup message is received, receiving on the first channel (S250) either an RRC connection-required message or an RRC connection-not-required message to determine (S260) whether to enter an idle state (S267) and terminate the network connection process (S270) or re-transmit the RRC connection request message (S210).

In step S202, an RRC connection message associated with a user service to which the terminal 410 subscribes is received on a first channel from the UTRAN 520. The terminal 410 then transmits an RRC connection request message to the UTRAN 520 in step S210. The RRC connection request message requests that an RRC Connection setup message be sent on a second channel.

In step S225, the terminal 410 initializes an internal timer and monitors the second channel for an RRC connection setup message from the UTRAN 520. The terminal checks, in step S230, whether an RRC connection setup message was received.

If an RRC connection setup message was received, a connection to the network is established in step S242 and an RRC connection setup complete message is transmitted to the network. Further re-transmission of RRC connection request messages is ceased in step S270.

If an RRC connection setup message was not received, it is determined in step S244 if the internal timer has expired. If the timer has not expired, the terminal 410 continues to check for receipt of an RRC connection setup message in step 230. If the timer has expired, the terminal 410 monitors the first channel in step S250.

The terminal 410 receives either an RRC connection-required message or an RRC connection-not-required message on the first channel in step S250. If an RRC connection-required message was received, the counting process is still ongoing and the terminal re-transmits the RRC connection request message in step S210. If an RRC connection-not-required message was received, the counting process has ended and the terminal's RRC connection request was rejected. The terminal 410 enters an idle state in step S267 and the network connection process is abandoned, with further re-transmission of RRC connection request messages ceased in step S270.

Figure 8:
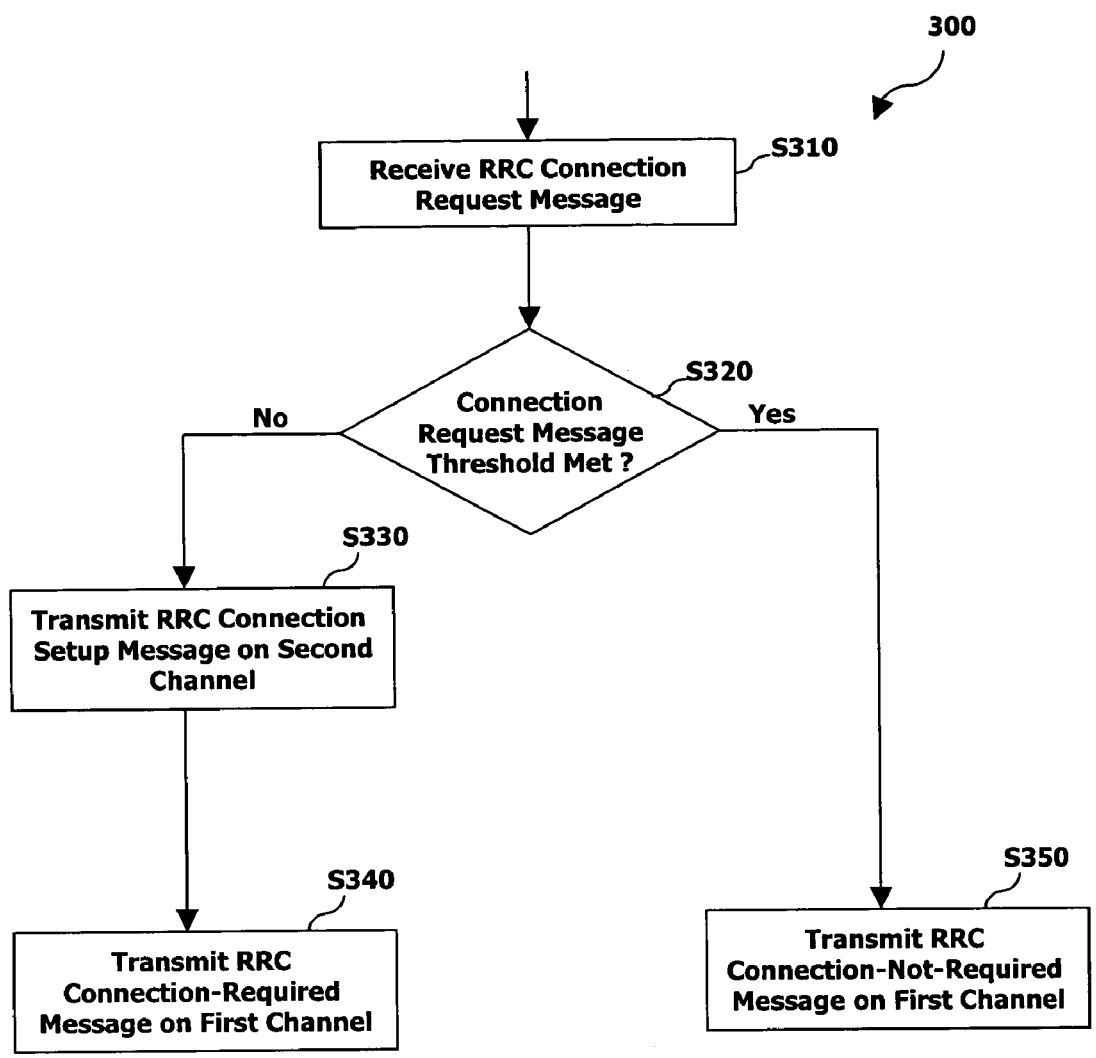
FIG. 8 illustrates a method for transmitting an RRC connection setup message, an RRC connection-required message or an RRC connection-not-required message according to one embodiment of the present invention.

FIG. 8 illustrates a method 300 for processing RRC connection request messages and either transmitting an RRC connection setup message and an RRC connection-required message or an RRC connection-not-required message in a network according to one embodiment of the present invention. The method 300 includes receiving an RRC connection request message (S310) and determining whether a threshold has been met for processing RRC connection request messages (S320). If the RRC connection request threshold has not been met, an RRC connection setup message is transmitted to the terminal which sent the RRC connection request message (S330) and an RRC connection-required message is transmitted (S340). If the RRC connection request threshold has been met, an RRC connection-not-required message is transmitted (S350).

It should be noted that the order of the steps of the methods illustrated in FIGS. 7 and 8 are only exemplary and may be changed without departing from the intent of the present invention. Furthermore the methods illustrated in FIGS. 7 and 8 may be performed by the appropriate software and/or hardware in the UTRAN 520 and in each terminal 410.

Figure 9:
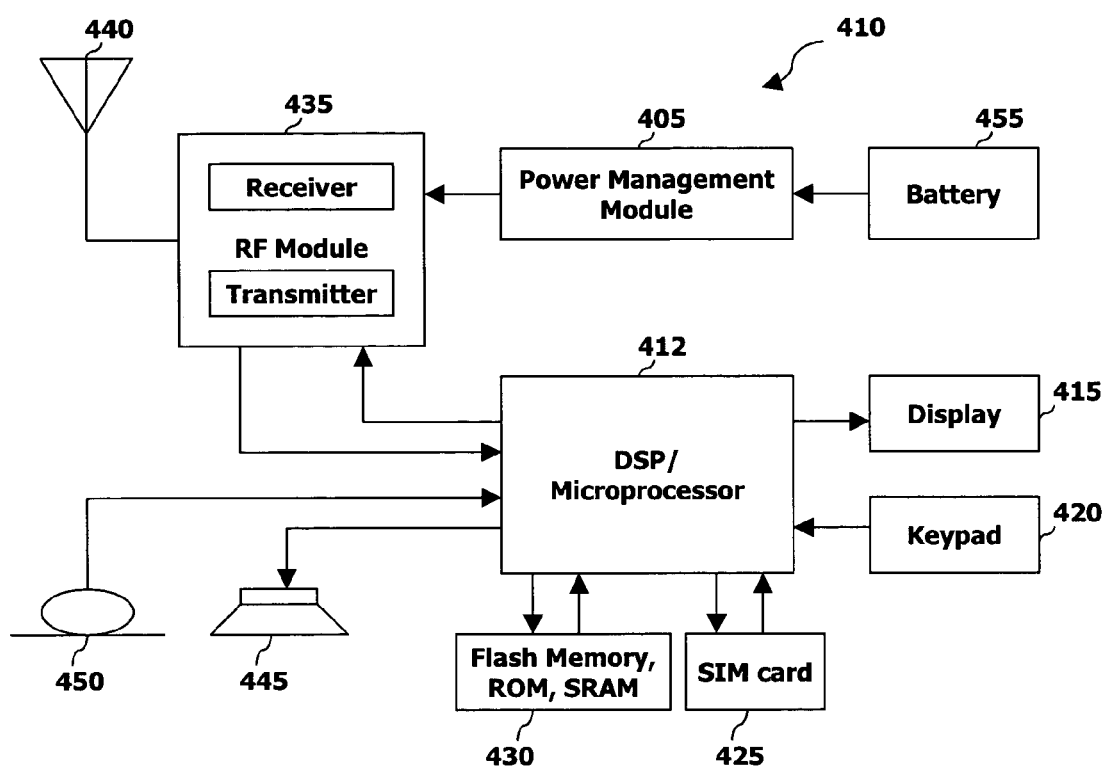
FIG. 9 illustrates a terminal for processing RRC connection setup messages, RRC connection-required messages and RRC connection-not-required messages according to one embodiment of the present invention.

FIG. 9 illustrates a block diagram of a terminal 410 according to a preferred embodiment of the present invention. The terminal 410 comprises a processor or digital signal processor 412, RF module 435, power management module 405, antenna 440, battery 455, display 415, keypad 420, memory 430, SIM card 425 (which may be optional), speaker 445 and microphone 450.

A user enters instructional information, such as a telephone number, for example, by pushing the buttons of a keypad 420 or by voice activation using the microphone 450. The processor 412 receives and processes the instructional information to perform the appropriate function, such as to dial the telephone number. Operational data may be retrieved from the Subscriber Identity Module (SIM) card 425 or the memory module 430 to perform the function. Furthermore, the processor 412 may display the instructional and operational information on the display 415 for the user's reference and convenience. Moreover, the processor 412 is adapted to perform the method 200 illustrated in FIG. 7.

The processor 412 issues instructional information to the RF module 435, to initiate communication, for example, transmit radio signals comprising voice communication data or transmit an RRC connection request message as described herein. The RF module 435 comprises a receiver and a transmitter to receive and transmit radio signals. An antenna 440 facilitates the transmission and reception of radio signals. Upon receiving radio signals such as an RRC connection setup message, RRC connection-required message or RRC connection-not-required message from the network as described herein, the RF module 435 may forward and convert the signals to baseband frequency for processing by the processor 412. The processed signals may also be transformed into audible or readable information outputted via the speaker 445, for example if the radio signals are an incoming phone call.

Figure 10:
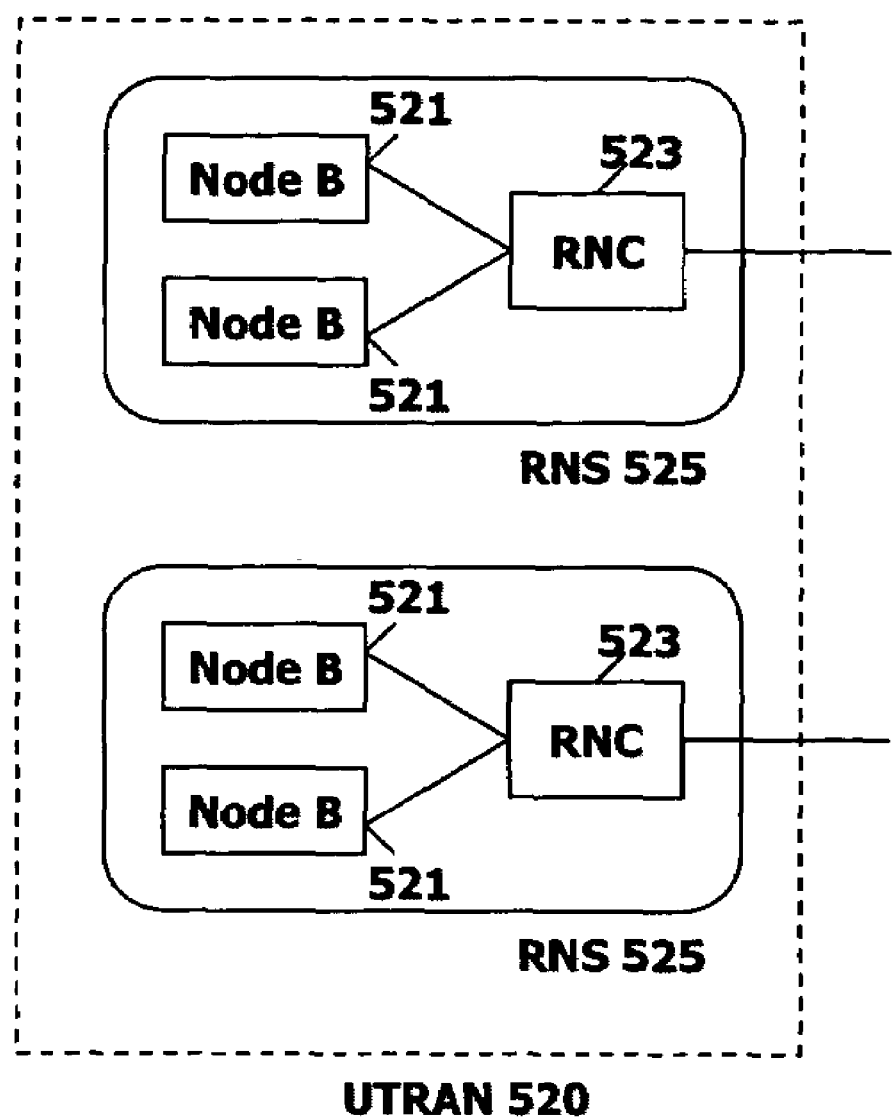
FIG. 10 illustrates a network for transmitting RRC connection setup messages, RRC connection-required messages and RRC connection-not-required messages according to one embodiment of the present invention.

FIG. 10 illustrates a block diagram of a UTRAN 520 according to a preferred embodiment of the present invention. The UTRAN 520 includes one or more radio network subsystems (RNS) 525. Each RNS 525 includes a radio network controller (RNC) 523 and a plurality of Node-Bs (base stations) 521 managed by the RNC. The RNC 523 handles the assignment and management of radio resources and operates as an access point with respect to the core network 30. Furthermore, the RNC 523 is adapted to perform the method 300 illustrated in FIG. 8.

The Node-Bs 521 receive information sent by the physical layer of the terminal 410 through an uplink, and transmit data to the terminal through a downlink. The Node-Bs 521 operate as access points, or as a transmitter and receiver, of the UTRAN 520 for the terminal 410.

In the related art, when the UTRAN 20 rejects the RRC connection requests transmitted from certain terminals 10, a reject message must be transmitted to each terminal whose RRC connection request is rejected. An undesirably long time is required to transmit multiple reject messages, which wastes downlink radio resources. Uplink radio resource may be wasted as well because some terminals 10 may re-transmit their RRC connection requests if they do not receive any response from the UTRAN 20 within an allowed time.

The present invention facilitates transmitting a single counting end message, for example an RRC connection-not-required message, to reject the RRC connection requests of a plurality of terminals 410, thereby minimizing waste of radio resources and providing a quick response to those terminals that transmitted a request. It can be understood that the present invention would be especially advantageous when providing a multicast service to a large number of terminals 410.

It will be apparent to one skilled in the art that the preferred embodiments of the present invention can be readily implemented using, for example, the processor 412 or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

The forgoing embodiments and advantages are merely exemplary and are not to be construed as limiting the present invention. The present teaching can be readily applied to other types of apparatuses. The description of the present invention is intended to be illustrative, and not limit the scope of the claims. Many alternatives, modifications, and variation will be apparent to those skilled in the art. In the claims, means-plus-function clauses are intended to cover the structure described herein as performing the recited function and not only structural equivalents but also equivalent structures.

What is claimed is:

1. A method for establishing a Radio Resource Control (RRC) connection between a terminal and a network in a mobile communications system in which the network provides a Multimedia Broadcast/Multicast Service (MBMS) to the terminal, the method comprising:
    transmitting an RRC connection request message to the network;
    receiving a counting status information message from the network if an RRC connection setup message is not received from the network on a first channel within a certain period of time, the counting status information message received on a second channel; and
    determining whether to re-transmit the RRC connection request message based upon the counting status information message,
    wherein the counting status information message is an RRC message transmitted to all terminals in a cell desiring to receive the MBMS service.

2. The method of claim 1, wherein the counting status information indicates whether a counting process has been completed.

3. The method of claim 1, wherein the counting status information message includes a counting end command indicating that a counting process for the MBMS service has been completed or a counting perform command indicating that the counting process is in progress for the MBMS service.

4. The method of claim 3, further comprising:
    re-transmitting the RRC connection request message if the counting status information message includes the counting perform command and not re-transmitting the RRC connection request message if the counting status information message includes the counting end command.

5. The method of claim 1, wherein the second channel is an MBMS control channel.

6. The method of claim 1, wherein the first channel is a common control channel.

7. The method of claim 1, wherein the counting status information message is an MBMS access information message.

8. The method of claim 1, wherein the RRC connection request message is transmitted through the first channel.

9. The method of claim 1, further comprising:
    setting a timer to count the certain period of time after transmitting the RRC connection request message.

10. The method of claim 1, further comprising:
    switching from the first channel to the second channel after transmitting the RRC connection request message; and
    switching from the second channel to the first channel after waiting the certain period of time.

11. The method of claim 1, wherein the terminal is in an idle mode or an idle state.

12. A method for establishing a Radio Resource Control (RRC) connection between at least one terminal and a network in a mobile communications system in which the network provides a Multimedia Broadcast/Multicast Service (MBMS) to the at least one terminal, the method comprising:
    receiving a RRC connection request message from the at least one terminal;
    transmitting a RRC connection setup message on a first channel; and
    transmitting a counting status information message on a second channel to all terminals in a cell that desire to receive the MBMS service when the terminals in the cell do not receive the connection setup message within a certain period of time,
    wherein the counting status information message is an RRC message transmitted to all terminals in a cell desiring to receive the MBMS service.

13. The method of claim 12, wherein the counting status information indicates whether a counting process has been completed.

14. The method of claim 12, wherein the counting status information message includes a counting end command indicating that a counting process for the MBMS service has been completed or a counting perform command indicating that the counting process is in progress for the MBMS service.

15. The method of claim 12, wherein the second channel is a MBMS control channel.

16. The method of claim 12, wherein the first channel is a common control channel.

17. The method of claim 12, wherein the counting status information message is a MBMS access information message.

18. The method of claim 12, wherein the RRC connection request message is transmitted through the first channel.

19. The method of claim 12, wherein the at least one terminal is in an idle mode or an idle state.

* * * * *